_US005987107A_

United States Patent [19]

Brown

[11] Patent Number: 5,987,107
[45] Date of Patent: Nov. 16, 1999

[54] CHARGING FOR USAGE OF A TELECOMMUNICATIONS NETWORK

[75] Inventor: Anthony S. Brown, Southend, United Kingdom

[73] Assignee: British Telecommunications Public Limited Company, London, United Kingdom

[21] Appl. No.: 08/712,728

[22] Filed: Aug. 30, 1996

Related U.S. Application Data

[63] Continuation of application No. PCT/GB95/00451, Mar. 2, 1995, and a continuation-in-part of application No. 08/231,939, Apr. 25, 1994, abandoned.

[30] Foreign Application Priority Data

Mar. 2, 1994 [EP] European Pat. Off. .............. 94301477

[51] Int. Cl.$^6$ ................................................. H04M 15/00
[52] U.S. Cl. ........................ 379/114; 379/111; 379/119; 379/124
[58] Field of Search ..................... 379/111, 112, 379/114, 115, 119, 121, 120, 126, 127, 220, 222, 224, 229, 116, 124

[56] References Cited

U.S. PATENT DOCUMENTS

| 5,003,584 | 3/1991 | Benyacar et al. ........................ 379/112 |
| 5,008,929 | 4/1991 | Olsen et al. ............................. 379/115 |
| 5,103,475 | 4/1992 | Shuen ..................................... 379/116 |
| 5,185,785 | 2/1993 | Funk et al. .............................. 379/111 |
| 5,325,290 | 6/1994 | Cauffman et al. ...................... 379/112 |
| 5,333,183 | 7/1994 | Herbert .................................. 379/112 |
| 5,815,559 | 9/1998 | Schnable ................................ 379/114 |

FOREIGN PATENT DOCUMENTS

| 2138170 | 6/1993 | Canada ........................... H04M 3/42 |
| WO 91/16779 | 10/1991 | WIPO ........................... H04M 15/12 |
| WO 93/08661 | 4/1993 | WIPO ........................... H04M 15/00 |

OTHER PUBLICATIONS

AT&T Communications, Adm. Rates and Tarriffs, Tariff F.C.C. No. 1, 3rd Revised p. 178.69.1, Jan. 5, 1993.
"Sample C&P Bill", C&P Telephone, White Pages, A C&P Telephone Directory Serivng: District of Columbia, Apr. 1991.
ISS 1992, vol. 1, Oct. 1992, Yokohama, Japan, pp. 299–303, XP350403, "Evolution of Billing Architecture".
Symton et al, "National Charging Database", British Telecommunications Engineering, vol. 10, Nol. 3, Oct. 1991, London, GB, pp. 250–253, XP279046.
Bridger et al, "Telecommunications Pricing Theory and Practice", pp. 152, 187–189, 197 and 207–212, prior to Mar. 2, 1994.

Primary Examiner—Curtis A. Kuntz
Assistant Examiner—Binh K. Tieu
Attorney, Agent, or Firm—Nixon & Vanderhye P.C.

[57] ABSTRACT

Charging details are produced for customers in response to their use of telecommunications services. Details of call items for a customer are compiled and a plurality of call types (73, 75, 77) are defined. Each call item is identified as belonging to one of these call types and a notional charge is calculated for each item. Notional charges for each item are accumulated and call categories are defined, wherein at least one of said call categories has a discount rate associated therewith. Accumulated call type values are then mapped onto category accumulators in response to customer reference data.

15 Claims, 9 Drawing Sheets

CHARGING FOR USAGE OF A TELECOMMUNICATIONS NETWORK

CROSS-REFERENCE TO RELATED APPLICATION

This application is a continuation (under 35 USC §120/365) of copending PCT/GB95/00451 designating the U.S. and filed Mar. 2, 1995 as, in turn, a continuation-in-part (under 35 USC §120/365) of U.S. application Ser. No. 08/231,939 filed Apr. 25, 1994, now abandoned.

BACKGROUND OF THE INVENTION

1. Field of the Invention

The present Application relates to a method of, and an apparatus for, producing charging details for charging customers for use of telecommunications services, of the type in which details of call items are compiled.

2. Related Art

The majority of telecommunications services are provided by the public switched telephone network (PSTN) in which the fundamental element of charging is that derived from the actual use made by the network. Thus, a customer may have access to literally millions of other customers connected to the network but, except for a modest standing charge, charges are only made when the customer establishes communication with another customer connected to the network.

In determining charges for a switched call, components which can affect the charge are (a) the geographical location of the customer being called, (b) the duration of the call and (c) the way in which the call is established. In particular, calls which are established by the direct dialling method are usually charges at a lower rate than charged calls connected by a manual operator.

Under a conventional billing environment, it is a relatively straightforward procedure to develop systems and apparatus for converting these parameters into actual billable amounts. Thus, after all of the necessary information has been collected from local exchanges, where it is stored as calls are being made, it is possible to supply this information to a procedure, whereupon charges are generated automatically and bills dispatched in a highly automated and efficient manner.

Problems can arise, firstly, when it becomes desirable to make modifications to the way in which physical usage of a network is translated into billable amounts. Particularly as telecommunications environments are becoming more competitive, it is desirable to implement more sophisticated marketing tools, so as to provide a competitive edge and so as to maximise revenue from a client base, which is itself becoming more and more sophisticated.

Secondly, technical advances are made which increase the variety of types of call available, such as new exchange systems which may allow a call made on one telephone to be charged to another telephone account, possibly using charge cards or similar account procedures. Furthermore, charge cards may also be used for connecting a customer in a first country to a customer in a second country, while the bill is actually supplied to the originating customer in a third country.

Thirdly, problems can arise due to external charging or legislative constraints, such as variations being made to value added tax or similar taxes added to telephony charges.

It can be appreciated that it would be desirable to provide a more sophisticated system for the charging of usage within a telecommunications network, if only to take account of fiscal and technological constraints with minimal effort. However, having made progress towards overcoming many of the problems associated with changes of this type occurring, it would also be desirable to take full advantage of such a system, so as to be able to implement new marketing tools quickly and efficiently, preferably ahead of competitors, while at the same time minimising the risk of errors being introduced into the system.

A marketing tool which has particular advantage is that of providing discounts for particular types of call. As new marketing opportunities arise, it is advantageous to facilitate the incorporation of new discounting schemes, for instance so as to encourage increased use of the network during off-peak periods. Furthermore, in addition to providing such services, it is also necessary to provide mechanisms by which customers may be selectively given access to these new services. Thus, with the inclusion of sophisticated discounting schemes, environments would exist in which, for a given collection of call usage data, the actual amount billed to a customer will depend upon whether the customer is signed up for a particular type of service.

SUMMARY OF THE INVENTION

According to a first aspect of the present invention, there is provided a method of producing charging details for charging customers for call items arising in use of telecommunications services of the aforesaid type, characterised by defining a plurality of call types; identifying each of said call items as belonging to one of said call types; calculating a notional charge for each call item; accumulating said notional charges for each call type in call type accumulators; defining call categories, wherein at least one of said call categories has a discount rate associated therewith; and mapping accumulated notional charges stored in said call type accumulators into category accumulators according to customer specific data.

Thus, the present invention provides for the accumulation of charges to be made for each respective call type. These call types will depend upon the physical environment provided by the telecommunications network and new call types may be added as technical advances are made. For each call type, an accumulation is made of the notional charge for items of that particular call type. Discounting options are taken into account by defining call categories. Thus, one or more accumulated notional item charges may be mapped onto a call category, as defined by customer specific data. Thereafter, a discounting calculation may be made in accordance with the value supplied to the category accumulator.

In a preferred embodiment, call items identify the way in which the call was made, the charging band for the call and the duration of the call. Preferably, each item is identified as belonging to a particular call type by analyzing its call related data and allocating a call-type identifying number thereto.

In a preferred embodiment, the customer specific data for each customer reflects an available set of terms and conditions of service, which may be identified as a customer's option, and the respective table is selected based upon the service selected, i.e. the option selected, by the customer.

The present invention facilitates the adoption of options defining calling circles. Thus, in accordance with the preferred embodiment, a calling circle category applies a discount to telephone calls made to a predetermined set of telephone numbers. Preferably, values accumulated to said calling circle category are derived from item accumulators which have in turn accumulated values representing directly dialed calls only.

In the above, the description "a notional charge" is used to describe a charge calculated a first instance, which may or may not be changed prior to billing a customer.

The step of mapping accumulated call type values into category accumulators, as set out in the first aspect of the present invention, could be done in more than one way in practice. It comprises the creation in each category accumulator of information identifying the notional charges from the call type accumulators to which the relevant call category applies. It may be done by loading in each category accumulator a pointer to the relevant call type accumulator (s), for instance, or by downloading all the notional charges in the relevant call type accumulator(s) to a category accumulator.

The customer specific data may be provided in the form of a reference table, for instance, or, in the parlance of current intelligent network technology, by means of a customer profile.

Embodiments of the present invention might be described as follows:

a method of processing call item data so as to generate charging data for use in billing customers for usage of telecommunications services, the method comprising the steps of:

i) sorting the call item data according to call type;

ii) calculating a first charge for each call item in accordance with its call type;

iii) accumulating said first charges for each call type, in call type accumulators;

iv) storing customer specific data, identifying one or more selected call categories relevant to respective customers;

v) further sorting said first charges, according to said one or more selected call categories; and vi) calculating a second charge for the first charges to which a selected call category applies.

It will be understood tat the order in which the steps are carried out does not have to be rigorously in the order as set out above. For instance, step iv) might be carried out at some time in advance of the other steps, when a customer first selects a discount package.

BRIEF DESCRIPTION OF THE DRAWINGS

The invention will now be described by way of example only, with reference to the accompanying drawings, in which.

DETAILED DESCRIPTION OF EXEMPLARY EMBODIMENTS

Figure 1:
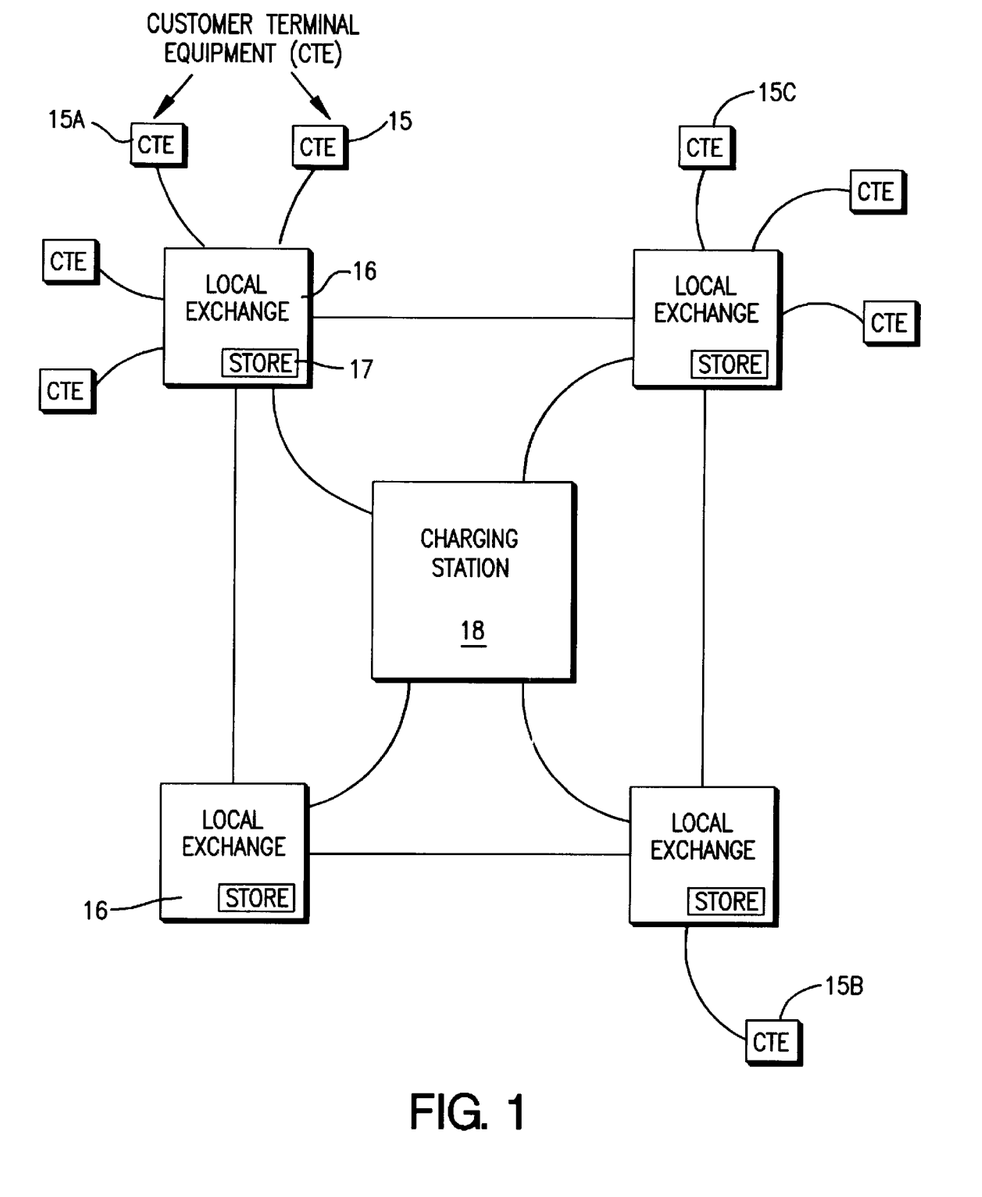
FIG. 1 schematically represents customer terminal equipment connected to interconnected local exchanges and a central charging station.

A schematic representation of customer terminal equipment 15 connected to a local exchange 16 is illustrated in FIG. 1. It should be appreciated however that FIG. 1 represents a simplified environment wherein the invention may be executed. In most practical environments, local exchanges will in turn be connected to trunk exchanges and trunk lines, conveying highly multiplexed channels, will in turn be connected together. The collection of charge related data may be effected in accordance with the topology shown in FIG. 1, however, in alternative embodiments, charging information may he directed to the charging station via trunk exchanges or via additional charge collecting systems.

Each local exchange includes storage means 17 for collecting data relating to calls made by customers 15 connected to the associated local exchange 16.

If a customer initiates a call using terminal equipment 15A to call terminal equipment 15B, data is logged in the storage means 17 of local exchange 16 identifying the telephone number of customer equipment 15B. In addition, information may also be stored concerning the charge band for customer equipment 15B, such as local, long distance or international etc. Furthermore, data is also stored which identifies the way in which the call was made. For example, this data may state that the call was made by the telephone number for terminal equipment 15B being dialled directly on terminal equipment 15A. Alternatively, the call could have been instigated with intervention from a manual operator which, usually, would result in a higher rate of charge for the caller 15A. It is also possible that, although terminal equipment 15A is being used to make the call, it is being made by a customer who is actually signed up for terminal equipment 15C and, using charge card facilities, the cost of the charge is to be re-directed to the account associated with terminal equipment 15C, rather than to the account associated wit terminal equipment 15A.

Telephone bills are usually despatched to customers on a quarterly basis and the trend has been towards the despatching of bills from a central charging office, rather than from each individual local exchange or regional exchange etc. The advantage of despatching bills from a central office is that, particularly with sophisticated systems which facilitate the use of charge cards etc, it is possible to obtain information from a plurality of sources and bring it together for inclusion on a single customer's bill. This is clearly advantageous from both the customers point of view and from the network provider's point of view, given that it is unnecessary to generate more than one account, with sophisticated services being added to conventional services and presented to the customer on a single account.

Thus, a central charging station 18 routinely polls each of the local exchanges 16 to obtain stored information relating to usage made by particular customers. For the purposes of this example, it will be assumed that the time has come for the central charging station 18 to generate a customer's account for the customer associated with terminal equipment 15A. The charging station 18 may have already been supplied with some of the information it requires, such as use of charge cards from other stations etc. It is now required to make a more conventional investigation as to normal-type telephone calls mare using terminal equipment 15A. Thus, the charging station 18 "polls" the storage device 17 at the local exchange 16 associated with the terminal equipment 15A. In response to a polling signal, storage device 17 supplies the data stored therein relating to terminal equipment 15A to the central charging station 18.

Clearly, it is essential from the network provider's point of view that sophisticated handshaking and security provisions are made when this information is transferred and many references are available describing how this may be achieved. However, suffice it to say for the purposes of the present disclosure, all of the relevant information is transferred from storage device 17 and the device 17 is effectively cleared so that it may start afresh recording new usage made using terminal equipment 15A, as part of the next charging period.

Figure 2:
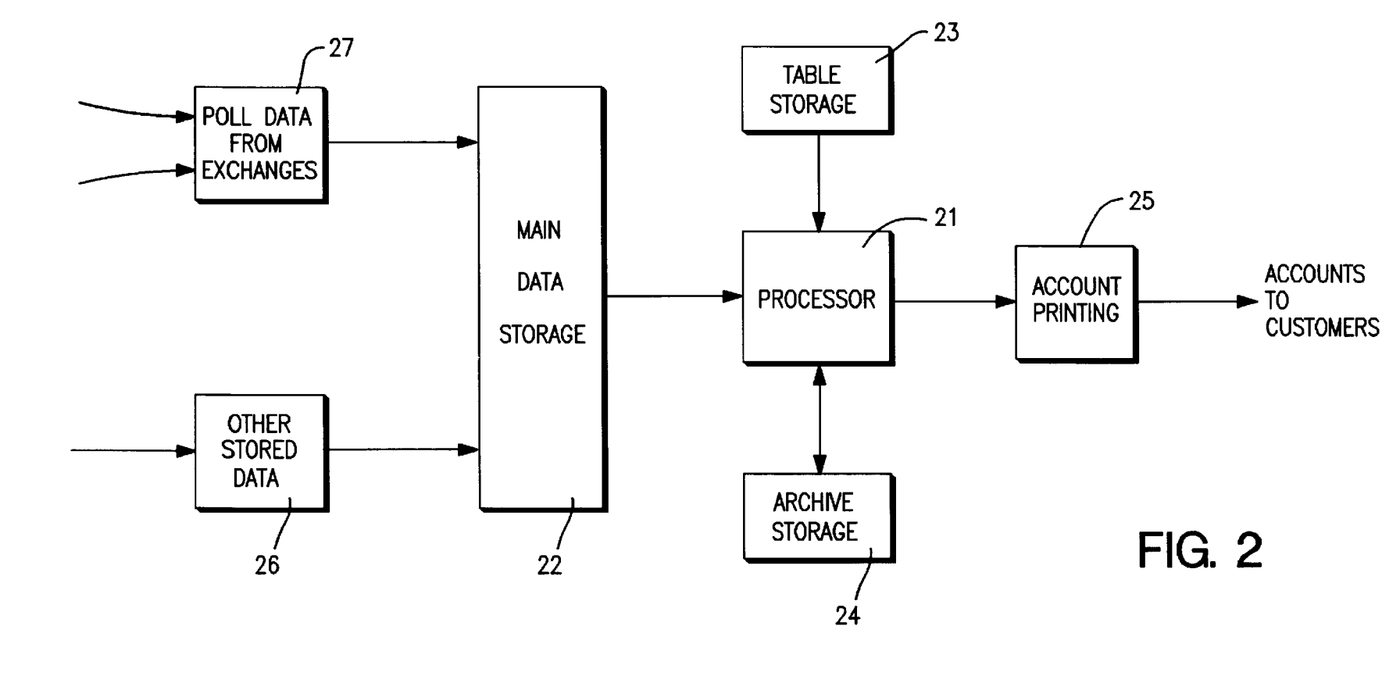
FIG. 2 details processing equipment provided at the charging station illustrated in FIG. 1, including a processor.

The charging station 18 includes a plurality of processing units running in parallel, each arranged to generate customer accounts. A typical system of the type found at charging station 18 is shown in FIG. 2. The system includes a central processor 21, arranged to receive data relating to customer usage from a main storage device 22, in addition to receiving customer tables from a table storage device 23. The processor 21 is also arranged to supply data to and receive data from archive storage area 24 and, fundamentally, the processor 21 is arranged to supply print data to accounts printing devices 25.

Customer usage information is supplied to the main data storage area 22 from remote storage areas 26, arranged to receive charge card usage and other sophisticated charging usage. Conventional charging usage, as previously described, is received from storage devices 17 at the local exchanges via a polling device 27, arranged to contact each of the local exchanges, possibly using facilities provided within the network itself and to receive data therefrom relating to usage for particular customers. Thus, under the control of a main co-ordinating processor, it is determined that a statement of account is to be produced for a particular customer, resulting in data associated with that customer, in the form of numbers called, duration of call and means by which the call was initiated, being collected in the main data storage area 22.

In response to program control, processor 21 is arranged to analyze the data stored in the main data storage area 22 and provide data which in turn may be supplied to the account printing device 25. In accordance with modern marketing trends, not all customers are offered the same terms and conditions, defining the way in which usage is translated into service charges. Thus, customers may be presented with a selection of options and, in accordance with their perceived demand for service uses, they may make a particular selection from the available options, thereby defining their terms and conditions of service. Furthermore, business customers may be offered a different set of options to domestic customers, reflecting the different operating conditions, with particular emphasis being placed on encouraging off-peak usage of the telecommunication network.

Thus, when processing a particular customer's account, it is necessary to load data relating to the particular option selected by the customer, and this data is supplied by the storage area 23, in the form of a customer's reference table and category definitions. These category definitions define the way in which discounts are applied to particular system usage. Thus, the invention facilitates the definition of calling circles in which a group of customers are identified as belonging to a circle and calls made within the circle are charged at a lower rate than similar calls made outside the circle.

Figure 3:
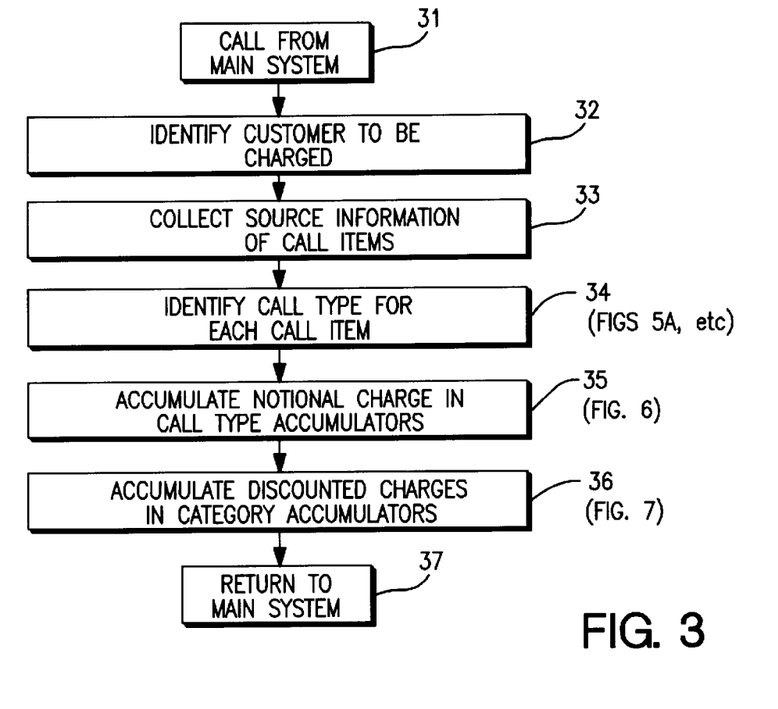
FIG. 3 illustrates the processes performed by the processor in calculating customer accounts, including the calculation of discounts.

An overview of some of the procedures performed by the processor 21, relevant to the present embodiment, are shown in FIG. 3. The procedures include a main control system, which in turn is responsible for calling particular operating procedures. Thus, at step 31 a call is made from the main operating system to the particular routine for accumulating charges and applying discounts.

At step 32 an identification is made of the customer to be charged, which in turn allows the particular option to be identified and the customer reference table and category definitions associated with that option to be read from the table storage area 23.

At step 33 the source information for call items associated with the identified customer are collected which, as previously stated, includes the collection of normal type data by polling local exchanges and the collection of more specialised data, including that relating to the use of charge cards etc.

At step 34, the data associated with the item is analyzed so as to associate said data with a particular call type. The procedures for implementing this step are detailed in FIGS. 5A, 5B, 5C and 5D.

After each call item has been associated with a particular call type, charges are calculated for each item and accumulated in respective call type accumulators, at step 35.

At step 36, discount charges are accumulated in category accumulators, by mapping values accumulated in the charge type accumulators to said category accumulators. Thus, after step 36, discounted charges have been calculated and control is returned to the main system at step 37.

Figure 4:
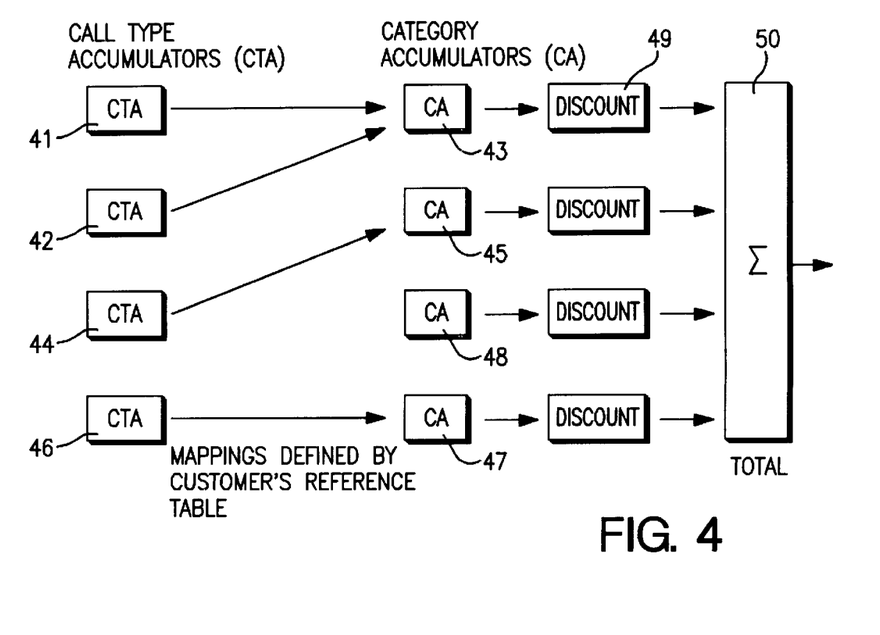
FIG. 4 represents an overview of the procedure used for calculating discounts, including the accumulation of category values from call type accumulators.

A graphical representation of the relationship between call type accumulators and category accumulators is shown in FIG. 4. At step 35 of FIG. 3, notional charges are calculated for each item and accumulated in the respective call type accumulator. Thus, call type accumulator 41 will accumulate all call charges associated with a first particular call type and, similarly, call type accumulator 42 will accumulate call charges associated with a second call type. However, in accordance with the selected option, the same discount applies to values accumulated in call type accumulator 41 as to values accumulated in call type accumulator 42. Thus, before the discounted charge is calculated, the values accumulated in both call type accumulators 41 and 42 are themselves accumulated in category accumulator 43.

Furthermore, in accordance with the option defined by the customer's reference table, values accumulated in call type accumulator 44 are transferred to category accumulator 45 and call type values accumulated in call type accumulator 46 are accumulated in category accumulator 47. In accordance with this particular option, category accumulator 48 is not used, although it may be used for other selectable options.

As shown in FIG. 4, a particular discount is applied, referenced 49, to each value accumulated in the category accumulators, whereafter said discounted values may be used to produce a final bill. In the example shown in FIG. 4, the discounted values are merely added together by a final output accumulator 50, although, in some situations, itemised bills will be produced finder respective headings derived from the categories.

The procedure identified as step 34 in FIG. 3, for identifying a call type for each call item, is detailed in FIGS. 5A, 5B, 5C and 5D. The process is initiated at step 71, at which the next data element is read and a question is asked at step 72 as to whether this element represents a metered call. A metered call does not include information identifying the called customer and does not result in an itemised entry on the final bill. If the question asked at step 72 is answered in the affirmative, confirming that the element represents a short duration call which will not be itemised, the element is identified as type 15 and control is directed to step 111.

Figure 5A:
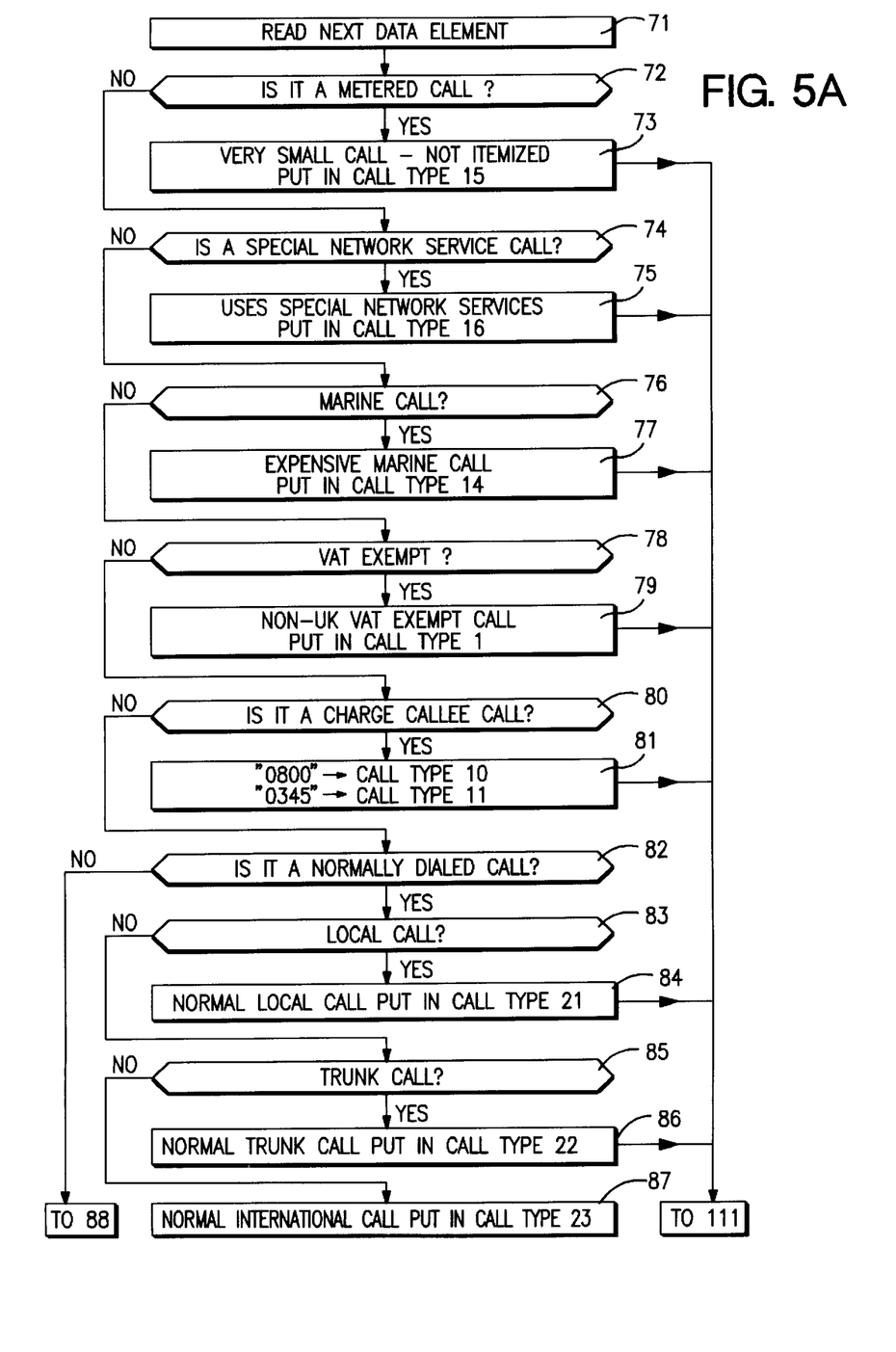
FIGS. 5A, 5B, 5C and 5D detail procedures for identifying call types.

If the question asked at step 72 is answered in the negative, control is directed at step 74 at which a question is asked as to whether the element represents a special network service call. Special network service calls provide services, within the public switched environment, commonly found on private equipment, such as private branch exchanges. Thus, special network services include three party calls, call waiting, call transfer and similar features, to which an additional subscription is required and for which it is unlikely that special discounts will be provided. Thus, if the question asked at step 74 is answered in the affirmative, to the effect that the element represents a special network service, the element is identified as being in type 16 and control is directed to step 111.

If the question asked at step 74 is answered in the negative, control is directed to step 76, where a question is asked as to whether the element represents a marine call. If this question is answered in the affirmative, to the effect that the element does represent an expensive marine call, probably using a satellite link, the call is identified as being of type 14 and control is directed to step 111.

If the question asked at step 76 is answered in the negative, control is directed to step 78, at which a question is asked as to whether the call is VAT exempt. VAT exemption occurs when a call, originating outside of the country for which a customer is VAT registered, is made to another customer outside the VAT registration area. Thus, if the question asked at step 78 is answered in the affirmative, the data element is identified as representing a call type 1 and control is directed to step 111.

If the question asked at step 78 is answered in the negative, a question is asked at step 80 as to whether the call is of the type where the customer called pays all or some of the call charge. In the United Kingdom, calls with a prefix "0800" are charged to the customer being called, while numbers having a prefix "0345" are only charged to the caller at local rate, the remainder being met by the person called. Thus, 0800 calls are identified as being in call type 10 and 0345 calls are identified as being in call type 11. Thereafter, control is directed to step 111.

If the question asked at step 80 is answered in the negative, control is directed to step 82, whereupon a question is asked as to whether the call was dialled in the normal way, that is to say, without use of a charge card and without operator intervention. If the question asked at step 82 is answered in the affirmative, a further question is asked at step 83 as to whether the data represents a local call. If this question is answered in the a firmative, to the effect that the data does represent a normal local call, the call is identified as being in type 21 and control is directed to step 111.

If the question asked at step 83 is answered in the negative, to the effect that the normally dialled call was not a local call, control is directed to step 85 at which a question is asked as to whether the call was a national long distance call or trunk call. If this question is answered in the affirmative, to the effect that the data represents a normal trunk call, the data is identified as being of type 22 and control is directed to step 111.

If the question asked at step 85 is answered in the negative, control is directed to step 87 at which the call is identified as being a normal international call, placing it in type 23, whereafter control is directed to step 111.

If the question asked at step 82 is answered in the negative, to the effect that the data does not represent a normally dialled call, control is directed to step 88 (FIG. 5B) whereupon a question is asked as to whether the information relates to a low-rate operator call. Operator calls are considered as being of two types: a low rate operator call occurs when a customer is forced to use an operator, having tried direct dialling techniques, whereas a high rate operator call occurs when a customer refers directly to an operator, without firstly attempting to make the call conventionally.

Figure 5B:
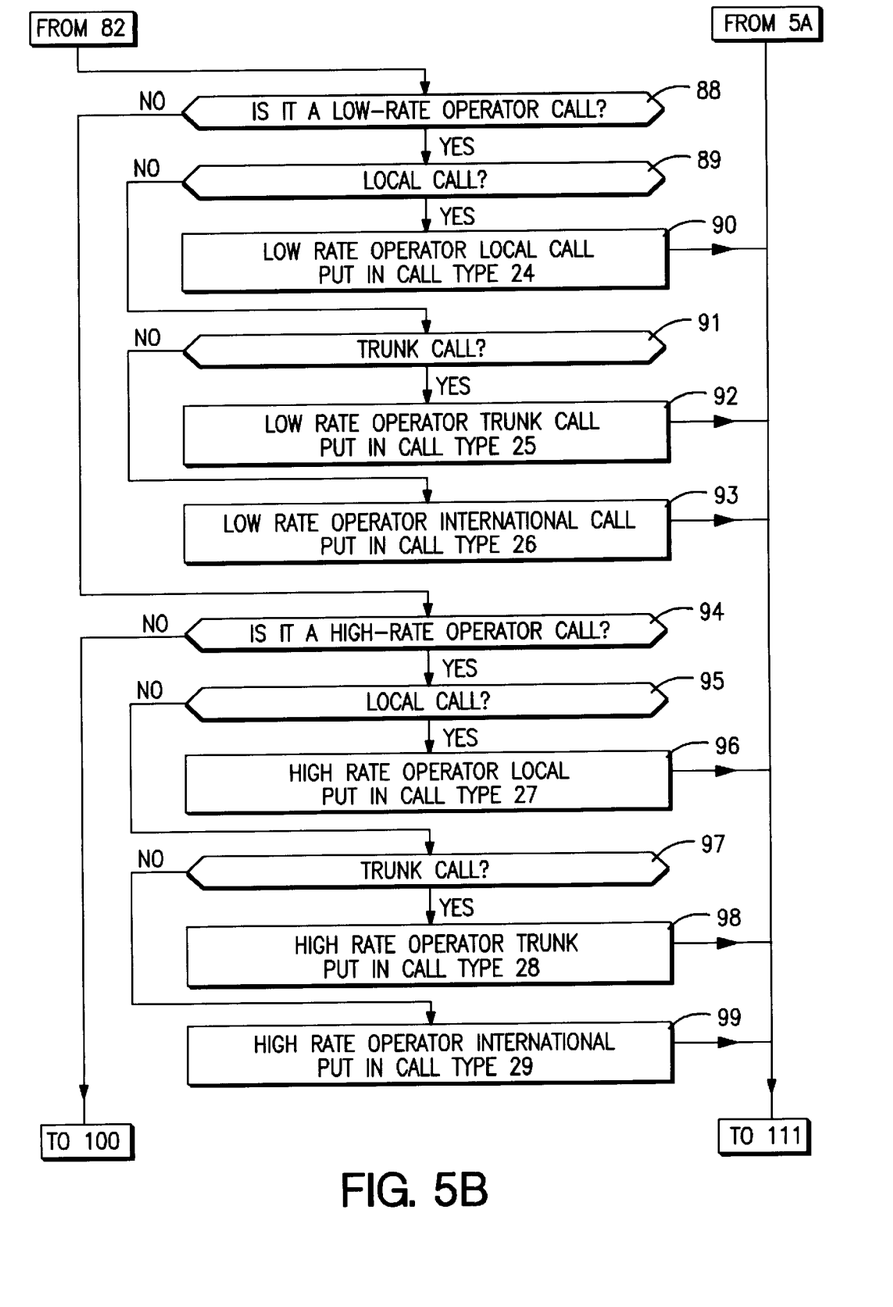

If the question asked at step 88 is answered in the affirmative, a question is asked at step 89 as to whether the data element represents a local call. If this question is answered in the affirmative, to the effect that a low rate operator local call was made, control is directed to step 90 and the call information is identified as being of type 24, whereafter control is directed to step 111.

If the question asked at step 89 is answered in the negative, control is directed to step 91, whereupon a question is asked as to whether the call was a trunk call. If this question is answered in the affirmative identifying a low rate operator trunk call, the call data is identified as being of type 25 and control is directed to step 111.

If the question asked at step 91 is answered in the negative, identifying that a low rate operator international call was made, control is directed to step 93 and the call information is identified as being of type 26, whereafter control is directed to step 111.

If the question asked at step 83 is answered in the negative, control is directed to step 94, whereupon a question is asked as to whether a high rate operator call was made. If this question is answered in the affirmative, control is directed to step 95, whereupon a question is asked as to whether a local call was made. If this question is answered in the affirmative, identifying the call as a high rate operator call, the call information is identified as being of type 27, whereafter control is directed to step 111.

Alternatively, if the question asked at step 95 is answered in the negative, control is directed to step 97, whereupon a question is asked as to whether the call was a trunk call. If this question is answered in the affirmative, identifying the call as a high rate operator trunk call, the call data is identified as being of type 28 and control is directed to step 111.

If the question asked at step 97 is answered in the negative, identifying the call as a high rate operator international call, control is directed to step 99, the call data is identified as being of type 29 and control is directed to step 111.

If the question asked at step 94 is answered in the negative, control is directed to step 100 (FIG. 5C) whereupon a question is asked as to whether the call was a direct dial charge card call. If this question is answered in the affirmative, a question is asked at step 101 as to whether the call was local and if this question is answered in the affirmative, identifying the call as a local direct dial charge card call, the call information is identified as being of call type 30 and control is directed to step 111.

Figure 5C:
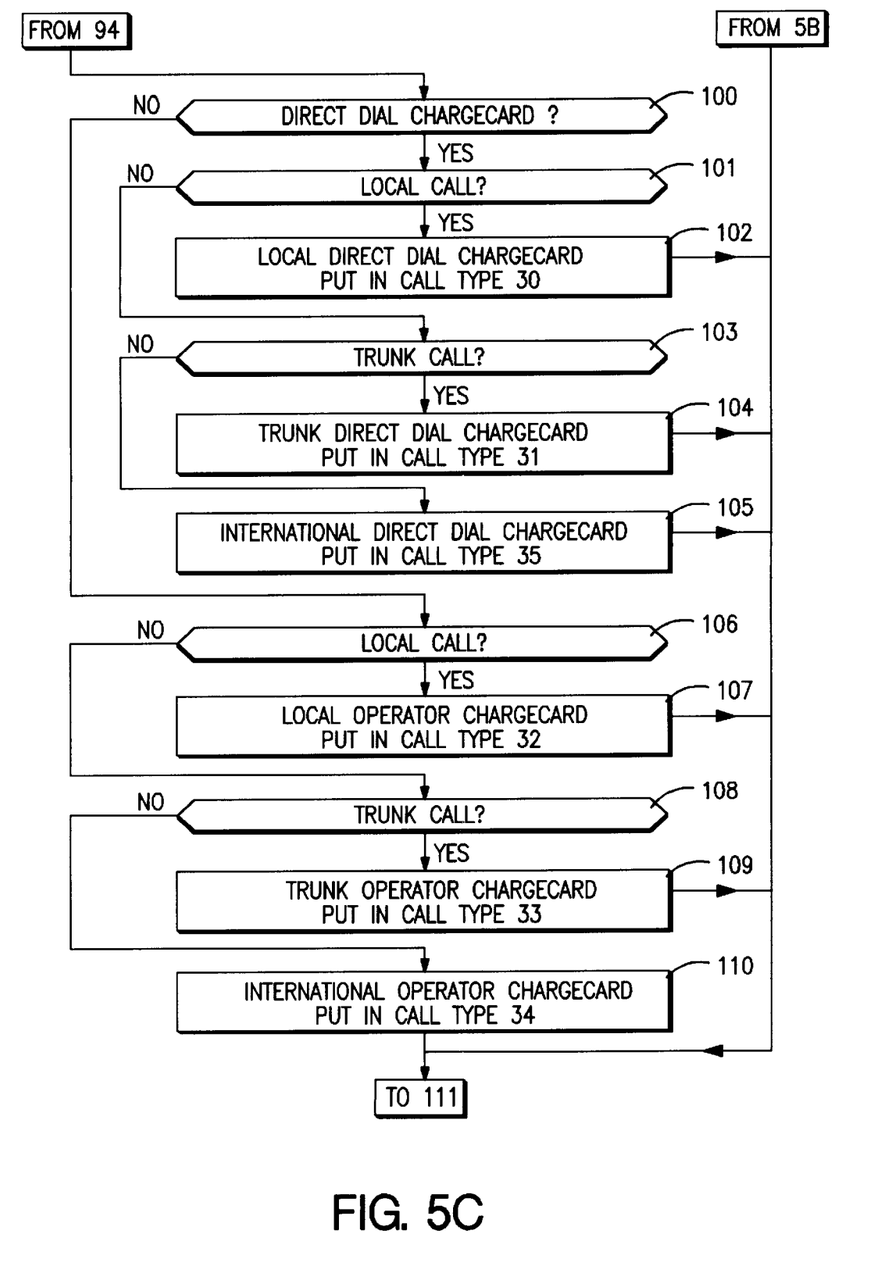

If the question asked at step 101 is answered in the negative, control is directed to step 103, whereupon a question is asked as to whether the call was a trunk call. If this question is answered in the affirmative, identifying the call as a trunk direct dial charge card call, the call information is identified as being in call type 31 and control is directed to step 111.

Alternatively, if the question asked at step 103 is answered in the negative, identifying the call as an international directly dialled charge card call, control is directed to step 105 and the call information is identified as being in call type 35, whereafter control is directed to step 111.

If the question asked at step 100 is answered in the negative, the only remaining alternative is that the call was made using a charge card and via an operator. Thus, a question is asked at step 106 as to whether the call was local and if this question is answered in the affirmative, identifying the call as a local operator charge card call, the call information is identified as being in type 32 and control is directed to step 111.

If the question asked at step 106 is answered in the negative, control is directed to step 108, where a question is asked as to whether the call was a trunk call. If this question is answered in the affirmative, control is directed to step 109, identifying the call as a trunk operator charge card call and the call information is identified as being of call type 33.

If the question asked at step 108 is answered in the negative, control is directed to step 110, identifying the call as an international operator charge card call and the call information is identified as being of call type 34, whereafter control is directed to step 111.

Figure 5D:
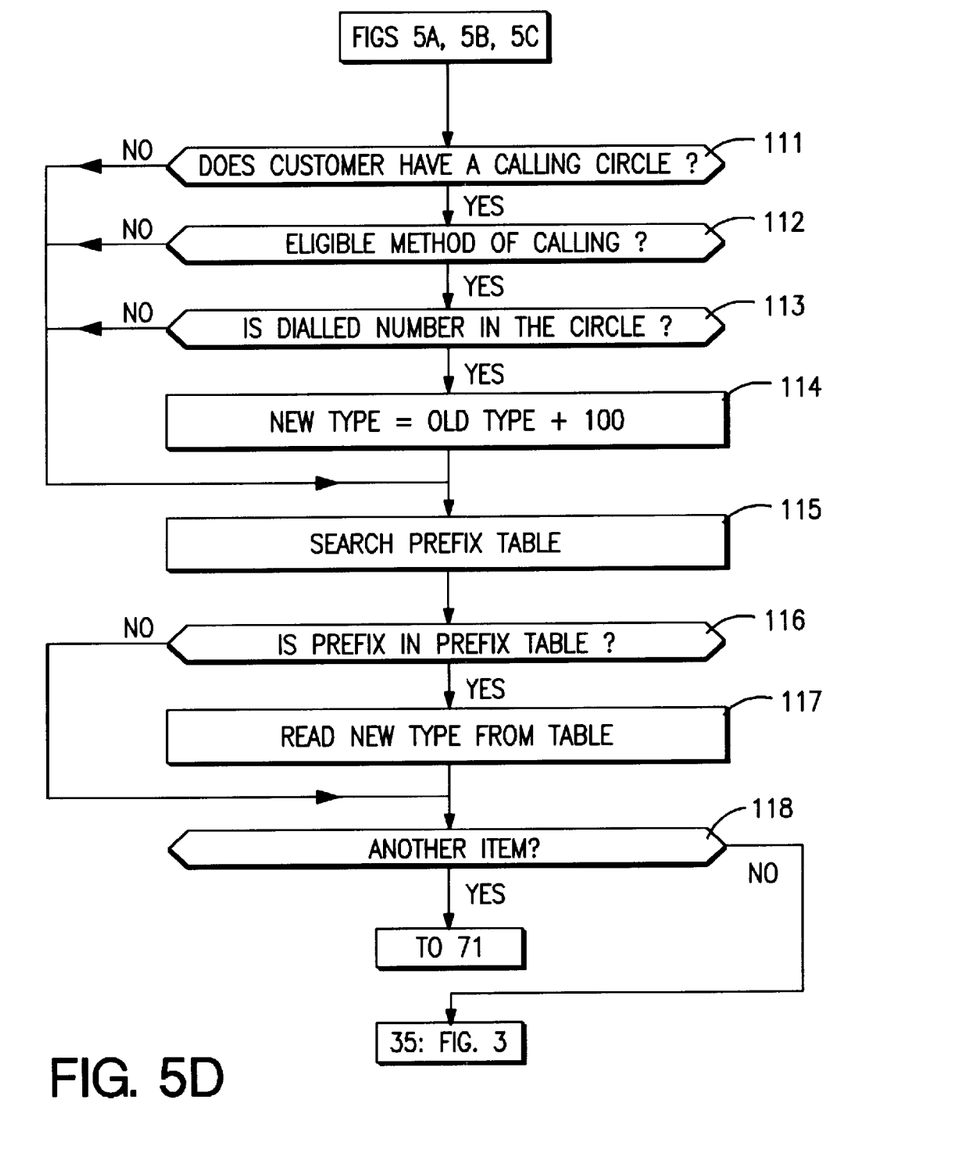

At step 111 a question is asked as to whether the customer has a calling circle. A calling circle is a particular type of discounting facility in which a group of customers are mutually considered as being in a calling circle. A calling circle is a marketing tool used to encourage increased telephone usage, particularly amongst members of a family making social calls on a regular basis. Calling circle calls may be limited to particular types, for example, it may only be applicable to directly dialled calls and not to operator established calls, therefore if the question asked at step 111 is answered in the affirmative, a question is asked as to whether the method of calling is eligible for inclusion as a calling circle call.

If the question asked at step 112 is answered in the affirmative, a question is asked at step 113 as to whether the number dialled by the customer is in the calling circle. If the question asked at step 113 is answered in the affirmative, control is directed to step 114, whereupon a new call type is identified by adding 100 to the old type. Thus, for example, a manually dialled local call is identified at step 84 as belonging to call type 21. If this call is also eligible for inclusion within the calling circle, a new call type will be identified, at step 114, as call type 121.

After creating a new call type at step 114, control is directed to step 115. Control is also directed to step 115 if any of the questions asked at any of steps 111, 112 and 113 are answered in the negative.

At step 115 a preferable is searched to determine whether the number called includes a prefix which is present in the prefix table. The prefix table stores prefixes for premium rate services, which would generally not fall within any discounting scheme.

A question is asked at step 116 as to whether the prefix of the call is present in the prefix table. If the question asked at step 116 is answered in the affirmative, a new call type is read from the prefix table at step 117, whereafter a question is asked at step 118 as to whether there is another item to be processed.

If the question asked at step 116 is answered in the negative, control is directed to step 118 and if the question asked at step 118 is answered in the affirmative, control is directed to step 71 so as to repeat the above procedure. When all of the elements have been processed, the question asked at step 118 will be answered in the negative and control will be directed to step 35 of FIG. 3.

As previously stated, after each item has been identified as belonging to a particular call type, notional charges for the items are accumulated in respective type accumulators. The procedures identified at step 35 of FIG. 3 are detailed in FIG. 6.

Figure 6:
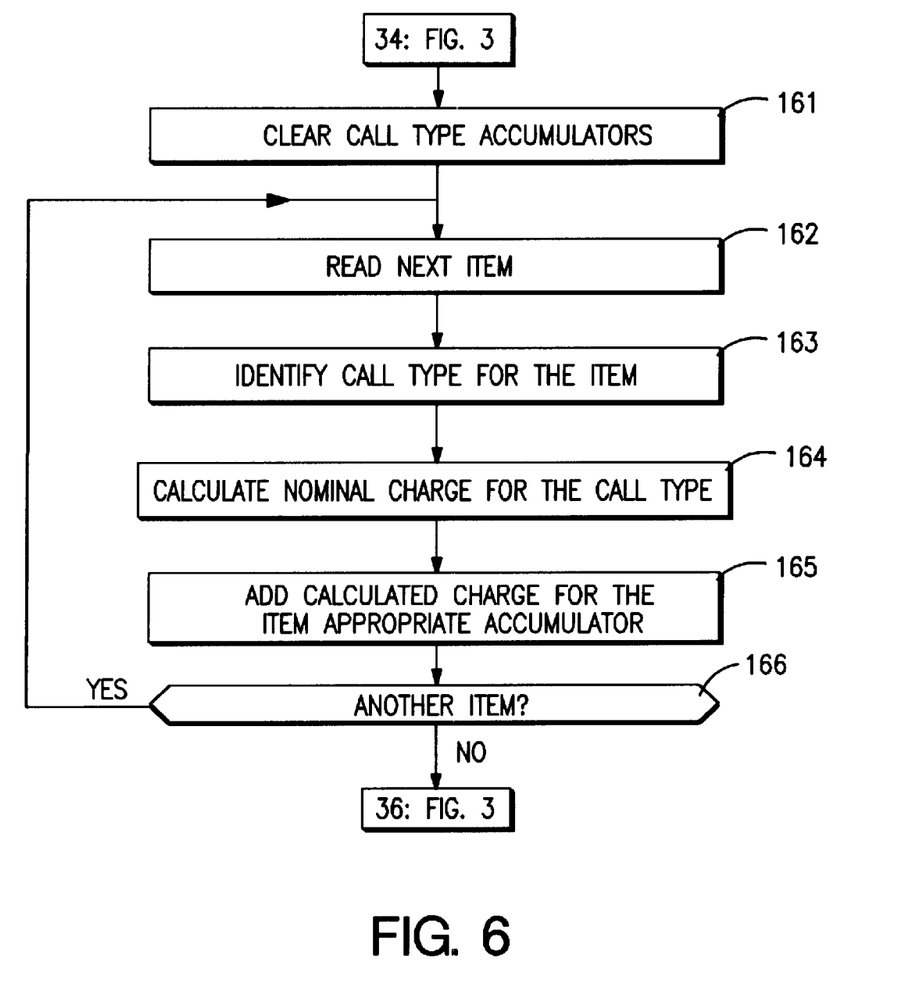
FIG. 6 details procedure for mapping accumulated call-type values to call type accumulators.

At step 161 the call type accumulators are cleared, thereby removing accumulated values for the previously processed customer data.

At step 162 data relating to the next item is read which, following the procedure carried out at step 34, will have a call type number associated therewith. Thus, at step 163, the call type number for the particular item is identified and at step 164 a calculation is made of the nominal charge for the particular call type. Thus, this nominal charge represents the charge which would be made to the customer, without the presence of any discounting scheme.

At step 65, the charge calculated at step 64 is added to the value stored in the respective call type accumulator and at step 166 a question is asked as to whether another item is present.

If the question asked at step 166 is answered in the affirmative, control is returned to step 162 and the next item is processed, thereby adding another nominal charge to an appropriate type accumulator. Eventually, the question asked at step 166 will be answered in the negative, and control will be directed to step 36.

Thus, after completing the processes identified in FIG. 6, values will have been accumulated in the call type accumulators, referenced 41, 42, 44 and 46 in FIG. 4. In accordance with the procedures identified at step 36, the next stage involves the transfer of values stored in the call type accumulators to the category accumulators. The procedures identified at step 36 of FIG. 3 are detailed in FIG. 7.

Figure 7:
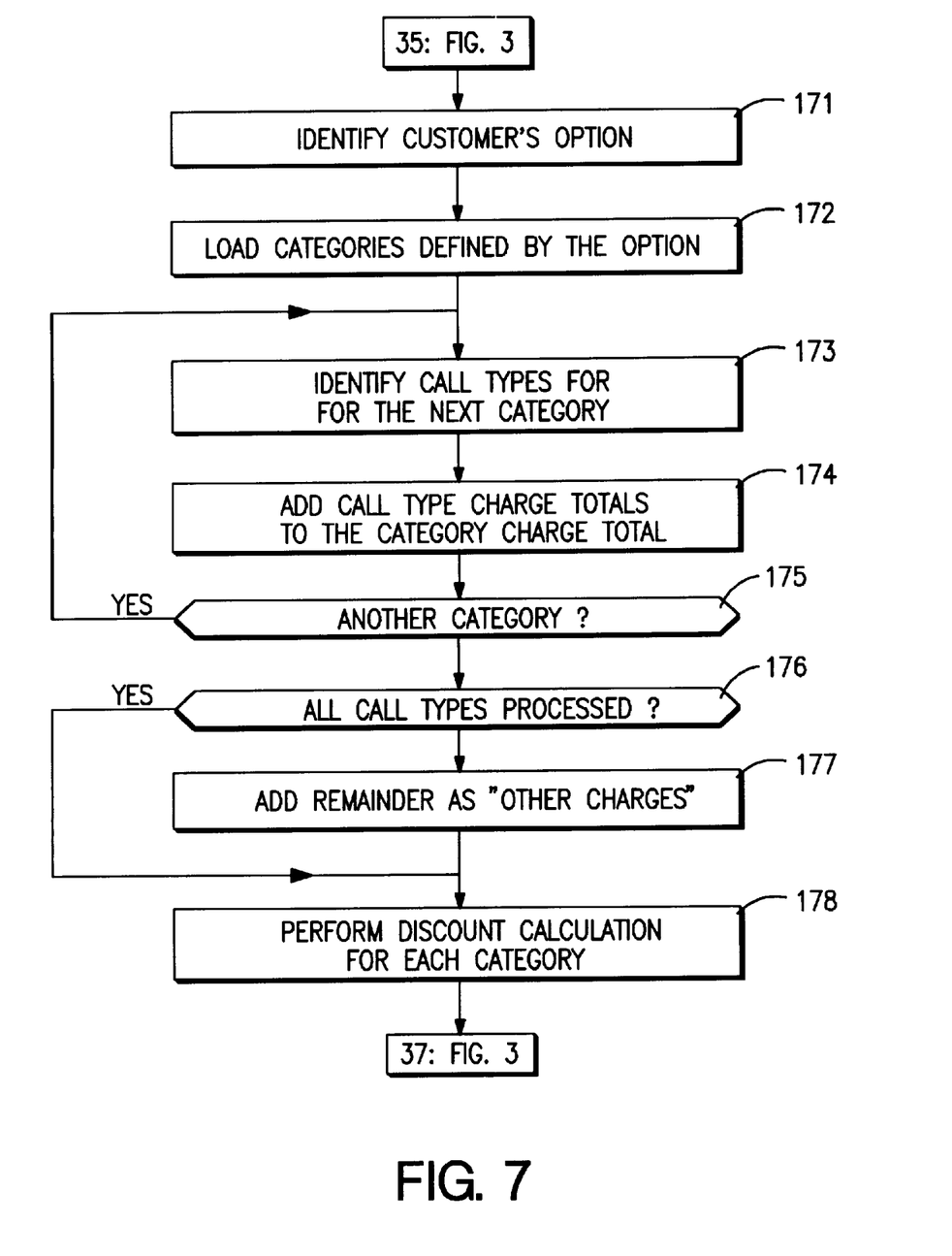
FIG. 7 details procedures for accumulating discounted charges in category accumulators.

At step 171, the customer's option is identified and at step 172 the categories defined by the option, along with the customer's reference table are loaded.

At step 173 the next category is considered which, on the first iteration, will be the first category and call types associated with this category are identified. Thus, referring to FIG. 4, on the first iteration, category 43 will be selected which, in turn, in accordance with the customer's reference table, will identify call type accumulators 41 and 42. At step 174, call type charges of the identified call type accumulators are added to the category charge total. Thus, referring again to the example shown in FIG. 4, after call type accumulators 41 and 42 have been identified at step 173, the values stored therein are added to category accumulator 43.

At step 175 a question is asked as to whether another category is present and when answered in the affirmative, control is returned to step 173. Thus, again referring to the example shown in FIG. 4, on the second iteration, the next category will be category 45, resulting in the charges accumulated in call type accumulator 44 being a accumulated in category accumulator 45.

Eventually, the question asked at step 175 will be answered in the negative, resulting in a question being asked at step 176 as to whether all of the call types have been processed. It is possible that the customers reference table will not provide a mapping for all call types. Consequently, any remaining call type accumulations are added together at step 177 and considered as "other charges".

At step 178 discount calculations are performed with respect to values accumulated in each of the category accumulators, graphically represented by reference 49 in FIG. 4. These discounted values then provide the final data on which a customer's account can be based.

The way in which these discounted values for each category are subsequently processed, to eventually provide a customer's account, is beyond the scope of the present invention. Conversion of the discounted values can be determined by other routines within the overall main system, therefore, after step 178 control is returned to the main system at step 37.

In the embodiment of the invention described above with reference to FIG. 4, it will be seen that contents of each call type accumulator 41 are transferred to one only of the category accumulators. This has the effect that only one discount package can be applied per call type. Although this has an advantage in Great Britain, where there are regulatory constraints concerning discounts, embodiments of the invention which allow multiple discounting on one call type should be considered to fall within the scope of the present invention. Hence, the contents of a call type accumulator might be read into more than one category accumulator and dealt with appropriately.

I claim:

1. A method of producing charging details for charging customers for use of telecommunications services, in which details of call items for a customer are compiled, said method comprising:

defining a plurality of call types;

identifying each of said call items as belonging to one of said call types;

calculating a notional charge for each call item;

accumulating said notional charges for each call type in call type accumulators;

defining call categories, wherein at least one of said call categories has a discount rate associated therewith; and mapping accumulated call type values stored in said call type accumulators into category accumulators according to customer specific data.

2. A method as in claim 1, wherein call items identify the way in which a call was made.

3. A method as in claim 1, wherein call items identify the charging band for a call.

4. A method as in claim 1, wherein call items identify the duration of the call.

5. A method as in claim 1, wherein each item is identified as belonging to a particular call type by analyzing its call related data and allocating a call type identifying number thereto.

6. A method as in claim 1, wherein at least one call category accumulator receives contributions from at least two call type accumulators.

7. A method as in claim 1, wherein the customer specific data reflects an available set of terms and conditions of service and a table is selected in dependence upon a service option selected by the customer.

8. A method as in claim 1, wherein a calling circle category applies a discount to telephone calls made to a predetermined set of telephone numbers.

9. A method as in claim 8, wherein values accumulated to said calling circle category are derived from data items representing directly dialed calls.

10. A method as in claim 1, wherein call data is identified as belonging to a particular call type by enquiring as to whether the data represents a particular call type and repeating this process until its call type has been identified.

11. A method of processing call item data so as to generate charging data for use in billing customers for usage of telecommunications services, the method comprising the steps of:

i) grouping the call item data according to call type;

ii) calculating a first charge for each call item in accordance with its call type;

iii) accumulating said first charges for each call type, in call type accumulators;

iv) storing customer-related data, identifying one or more selected call categories relevant to respective customers;

v) further grouping said first charges, according to said one or more selected call categories; and vi) calculating a second charge for the first charges to which a selected call category applies.

12. A method as in claim 11, wherein step v) comprises identifying all the call type accumulators to which each call category applies and transferring the accumulated first charges in each identified call type accumulator to a data store or data structure allocated to a respective call category.

13. A method as in claim 11, further comprising the following step:

vii) outputting the second charges calculated at step vi) to a billing facility.

14. Apparatus for charging customers for use of a telecommunications network, said apparatus comprising:

means for storing an item of data for each call made by said customer;

table storage means for storing data relating to charging options;

processing means for processing item data in combination with option data; and accounts printing means for printing account data generated by said processing means, said processing means including means for:

defining a plurality of call types;

identifying each of said call items as belonging to one of said call types;

calculating a notional charge for each call item;

accumulating said notional charges for each call type in call type accumulators;

defining call categories wherein at least one of said call categories has a discount rate associated therewith; and mapping accumulated call type values from said call type accumulators to category accumulators in accordance with customer specific data.

15. Apparatus as in claim 14, arranged to perform a method wherein call items identifying the way in which a call was made.

* * * * *